Figure 1:
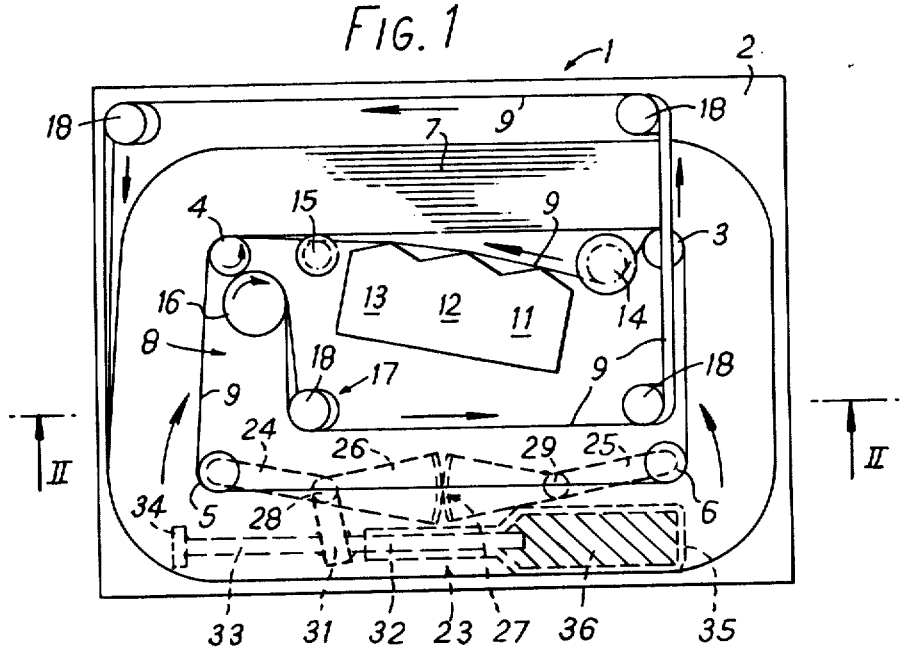

United States Patent [19]

Towner et al.

[11] 4,054,925
[45] Oct. 18, 1977

[54] ENDLESS LOOP RECORDER HAVING TEMPERATURE COMPENSATED TENSIONING

[75] Inventors: Frank Richard Towner, Seaford; Joseph Charles Hawkins, Wokingham, both of England

[73] Assignee: Sperry Rand Corporation, New York, N.Y.

[21] Appl. No.: 684,508

[22] Filed: May 7, 1976

[30] Foreign Application Priority Data

May 15, 1975 United Kingdom ............... 20484/75

[51] Int. Cl.² .................... G11B 15/43; G11B 15/70; B65H 17/48
[52] U.S. Cl. ......................................... 360/71; 360/5; 360/90; 242/55.19 R
[58] Field of Search ............................. 360/5, 90, 71; 242/55.17, 55.19, 15.19 A

[56] References Cited

U.S. PATENT DOCUMENTS

| | | | |
|---|---|---|---|
| 2,918,536 | 12/1959 | Appert et al. | 360/93 |
| 2,945,697 | 7/1960 | Maeder | 360/90 |
| 3,235,195 | 2/1966 | Hebb et al. | 360/93 |

*Primary Examiner*—Robert S. Tupper
*Attorney, Agent, or Firm*—Howard P. Terry; Joseph M. Roehl

[57] ABSTRACT

A data recorder comprising a recording medium in the form of an endless loop of magnetic tape, and one or more magnetic heads, the magnetic tape being wound around former means comprising a plurality of rotatable members to provide a tape store, the rotatable members and inner turn of tape defining within the center of the store an area in which the or each magnetic head is mounted.

13 Claims, 10 Drawing Figures

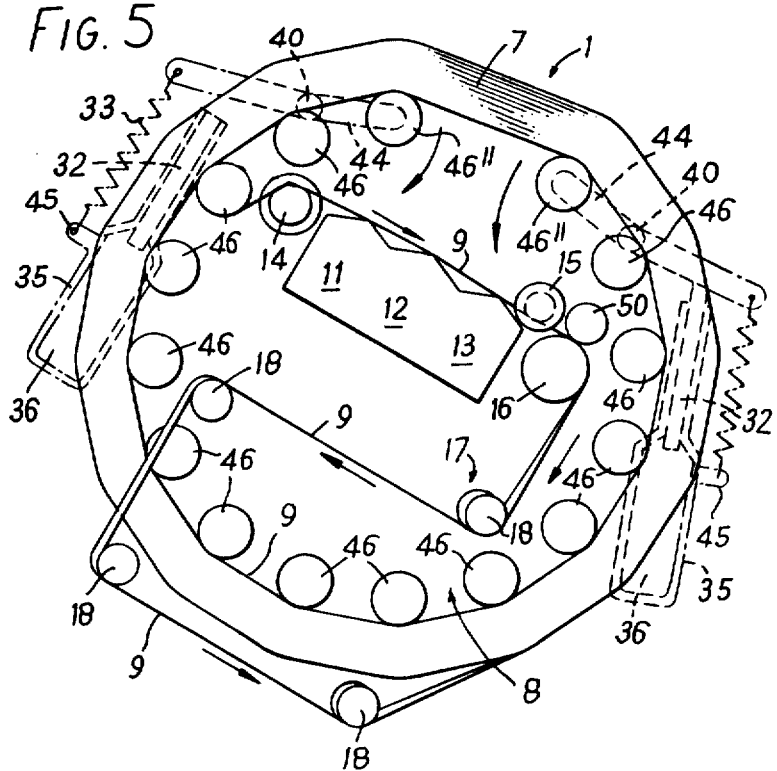
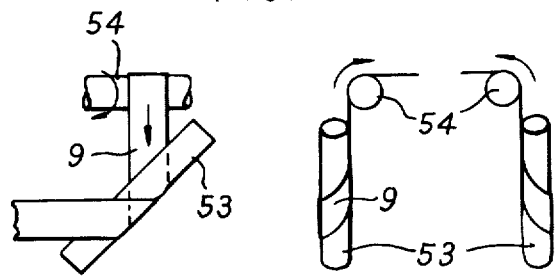

ENDLESS LOOP RECORDER HAVING TEMPERATURE COMPENSATED TENSIONING

This invention relates to data recorders and more particularly, although not exclusively, to flight data acquisition recorders commonly referred to as "crash" recorders to which reference will in the main be made for convenience.

Some known crash recorders employ an endless loop of magnetic tape as the recording medium, the tape being formed into a coiled store having a plurality of turns and drawn from the centre, passed over one or more magnetic heads and returned to the outer periphery of the store. The tape is coiled around a hub which provides a former for the tape but also provides a surface against which the inner turn of tape has to be pulled from the store and gives rise to a source of friction which can be troublesome. In normal operation of the recorder, this source of friction coupled with interlayer friction provides a certain tape holdback force but this is usually overcome by the tape drive mechanism which may be a capstan and pinch roller or a so-called co-belt arrangement. However, if the recorder is subjected to sustained acceleration, as a crash recorder often is during aircraft manoeuvres, any component of acceleration acting in a direction to compress the turns of the tape store causes the inner turn of tape to be nipped between the next turn and the hub, often to an extent which puts at risk the correct extraction of the inner turn of tape, whereby the recorder may malfunction.

Another problem associated with this form of recorder is that the inner turn of tape has to be extracted at an angle to the plane of the tape store in order to take it out of that plane, pass it over the store, and normally return it to said plane where it is moved over the magnetic head or heads before being returned to the outer periphery of the store. Thus there are two areas in this type of recorder where precision engineering is required to ensure proper operation of the equipment. The first area is that of the point of extraction of the inner turn of tape: it is essential that in pulling the tape at an angle to the plane of the store no permanent deformation of the tape occurs. The second area is that of the magnetic head or heads where it is important that the tape is accurately aligned with the head(s) as is well known.

It has been proposed to meet the problem of recorder malfunction due to sustained acceleration compressing the turns of tape by replacing the hub former by a dynamic surface in the form of a plurality of freely rotatable rollers, the inner turn of tape being extracted from the store over one of the rollers which helps to reduce the tape holdback force under all conditions. However, the extracted turn of tape still has to be taken out of the plane of the store, passed thereover, returned to said plane and moved over the magnetic head(s) so that the two precision areas discussed above remain.

According to a first aspect of the present invention, a data recorder comprises a recording medium in the form of an endless loop of magnetic tape, and one or more magnetic heads, the magnetic tape being wound around former means comprising a plurality of rotatable members to provide a tape store, the rotatable members and inner turn of tape defining within the centre of the store an area in which the or each magnetic head is mounted.

Thus the above discussed problems of known recorders are met by a recorder constructed in accordance with the present invention; the tape holdback force under all conditions is minimised due to the use of dynamic former means, and the two precision areas are combined into one located within the centre of the tape store. Of course, the tape still has to be lifted over the tape store so that it can be returned to the latter at the outer periphery thereof but the lift-over is downstream of the magnetic head(s) making tape alignment less critical and reducing tape drag since the lift-over is in the low tension area of the tape. Furthermore, the overall size of the tape deck of a recorder according to the invention will, in general, be smaller than that of a comparable prior recorder which is an extremely significant advantage, particularly in connection with crash recorders in view of the fact that space is at a premium in aircraft.

The number of rotatable members constituting the former means depends on the size, weight, optimum shape, etc. of the recorder as dictated by the use for which the recorder is being designed. For example, two rotatable members can be employed defining a generally elongated central area to accommodate the magnetic head(s), or three members defining a generally triangular area, or four members defining a generally rectangular area, or a greater number of members defining a generally circular area.

According to a second aspect of the invention there is provided a data recorder comprising a recording medium in the form of an endless loop of magnetic tape wound around former means comprising a plurality of rotatable members to provide a tape store, at least one of the rotatable members being movably mounted and movable by a temperature-compensation device, whereby expansion or contraction of the tape due to temperature variations is accommodated so as to maintain tension in the tape substantially constant.

Each movable rotatable member may be mounted on one end of a pivotable arm, the other end of which contacts a temperature-sensitive device, the latter pivoting the arm upon a change in temperature so as to move the rotatable member in the required direction. If two rotatable members are movably mounted, the pivotal arms thereof may be coupled together in a manner such that a single temperature-sensitive device can be used to effect the desired movement of both movable rotatable members. One form of temperature-sensitive device may be a cylinder and plunger, the cylinder containing a fluid, such as mercury or silicon fluid for example, which expands and contracts with temperature changes and either extends the plunger or enables the latter to be retracted. Plunger retraction may be effected by a spring acting on the appropriate pivotal arm, thus serving the further purpose of maintaining the arm in contact with the plunger.

It will be appreciated that a data recorder according to the first aspect of the present invention may be provided with a temperature-compensation device in a manner similar to that described in connection with the second aspect of the invention.

Figure 2:
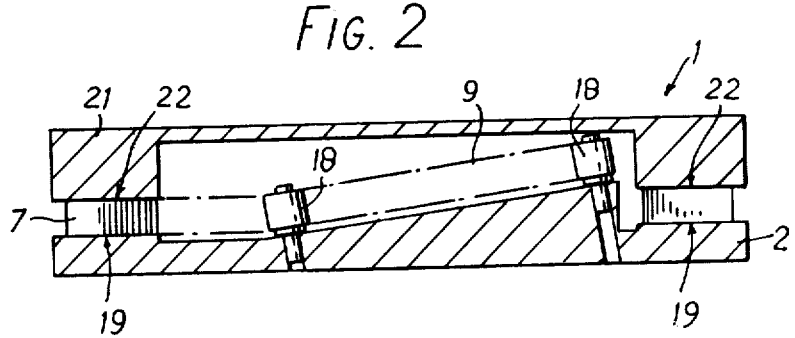

Several embodiments of the present invention will now be described in greater detail, by way of example, with reference to the accompanying drawings, in which:

FIG. 1 is a plan view of part of a tape deck of a crash recorder embodying the present invention, FIG. 2 is a section on the line II — II of FIG. 1, FIGS. 3 to 9 are somewhat diagrammatic views similar to that of FIG. 1 but showing respective alternative embodiments, and FIG. 10 shows a modification of a detail of FIGS. 1 to 9.

Referring to FIGS. 1 and 2, the tape deck of the recorder is indicated generally at 1 and comprises a mounting plate 2 and four rollers 3, 4, 5 and 6 freely rotatable and constituting former means around which an endless loop of Mylar magnetic tape is wound in a plurality of turns to provide a tape store 7. The rollers 3 and 4 are fixedly mounted on the plate 2, and the rollers 5 and 6 are movably mounted as will be described. The rollers 3, 4, 5 and 6 and the inner turn 9 of tape define a generally rectangular area 8 within the centre of the tape store 7 in which area is mounted a block of magnetic recording heads comprising an ERASE head 11, a WRITE head 12 and a READ head 13. For convenience, the reference numeral 9 has been used to indicate the actual inner turn of tape of the store 7 and also that part of the tape which has been extracted from the store and is being returned thereto in a manner to be described.

The inner turn 9 of tape is extracted from the tape store 7 at the roller 3 and passed around a freely-rotatable guide roller 14 before being moved over the heads 11, 12 and 13. After leaving the heads 11, 12 and 13, the tape 9 passes over a fixed guide 15 and then temporarily rejoins the store 7 as it passes over the roller 4 which is in fact a capstan with which is associated a pinch roller 16 also mounted on the plate 2, the tape being drawn by these two components by being passed between the nip thereof. The tape 9 then passes to lift-over means indicated generally at 17, and in this embodiment comprising four inclined rollers 18 mounted on the plate 2, and rejoins the tape store 7 at the outer periphery thereof. The inclinations of the respective rollers 18 are such as to lift the tape 9 from the plane of the tape store 7, so that it can be passed thereover, and then to return it to said plane prior to its arrival back at the store. Thus rotation of the capstan 4 pulls the tape 9 from the store, the tension in the stored tape causing the tape to re-stack itself on the outside of the store in the usual manner.

It will be appreciated that the components described so far combine to provide an extremely compact arrangement and that there is only one area requiring precision engineering, which is small, thereby reducing to an extreme minimum the problems normally encountered. The area concerned is that of the point of extraction of the inner turn 9 of tape at the roller 3, and the face of the heads 11, 12 and 13 with which the tape must be aligned accurately. Since the roller 3, heads 11, 12 and 13 and capstan 4 are located very close together and such that the tape 9 does not have to change planes in passing from one to another, there is little or no scope for the tape to become misaligned with the heads. Furthermore, it will be appreciated that as the lift-over means 17 operate on the tape 9 downstream of the heads 11, 12 and 13 and the capstan 4, then there will be less drag on the tape since it is now in its relatively low tension area.

As seen in FIG. 2, the mounting plate 1 is provided with a surface 19 which supports the lower edges of the turns of tape in the tape store 7. A further plate 21 (not shown for clarity in FIG. 1) is mounted over the tape store 7 and has a surface 22 which opposes the surface 19 of the plate 1, the two surfaces 19 and 22 providing support and guide means for the bulk of the tape store 7.

Since the recorder is designed for an aircraft, it may be subject to significant temperature variations, whereby a temperature-compensation device 23 for the tape is provided to ensure that a relatively constant tape tension is maintained. Referring again to FIG. 1, the temperature-compensation device 23 is associated with the rollers 5 and 6 and comprise arms 24, 25 on the respective outer ends of which these rollers are mounted. The inner ends of the arms 24 and 25 are in the form of toothed sectors 26 and 27, the teeth of the two sectors being arranged in mesh. The arms 24 and 25 are pivotally mounted on the plate 1 by respective intermediate pivots 28 and 29, and the arm 24 is provided with a projection 31 rigidly attached to that arm at one end. The other end of the projection 31 is urged into contact with a plunger 32 by a compression spring 33 acting between the projection and an abutment 34 on the plate 1. The plunger 32 acts in a cylinder 35 mounted on the plate 2 and filled with a liquid 36, such as mercury or silicon fluid, which expands upon an increase in temperature to force the plunger 32 out of the cylinder against the action of the spring 33, and contracts upon a decrease in temperature to allow the plunger to be retracted into the cylinder by the action of the spring.

Mylar tape possesses the characteristic of shrinking as the temperature thereof increases so that on expansion of the liquid 36 is arranged to move the arm 24 clockwise by way of the plunger 32 acting on the projection 31, whereby the roller 5 is moved towards the centre of the store 7, as is the roller 6 by virtue of the meshing sectors 26 and 27 which results in a counter-clockwise rotation of the arm 25. Thus tape shrinkage is accommodated and so is tape expansion, on cooling, by the operation in reverse of the temperature-compensation device 23. By careful selection of the liquid 36 (or any equivalent temperature-sensitive medium or device), the expansion thereof can be made to balance the contraction of the tape, and vice versa, to maintain the tape tension substantially constant at all temperatures within the operating range of the recorder.

Figure 3:
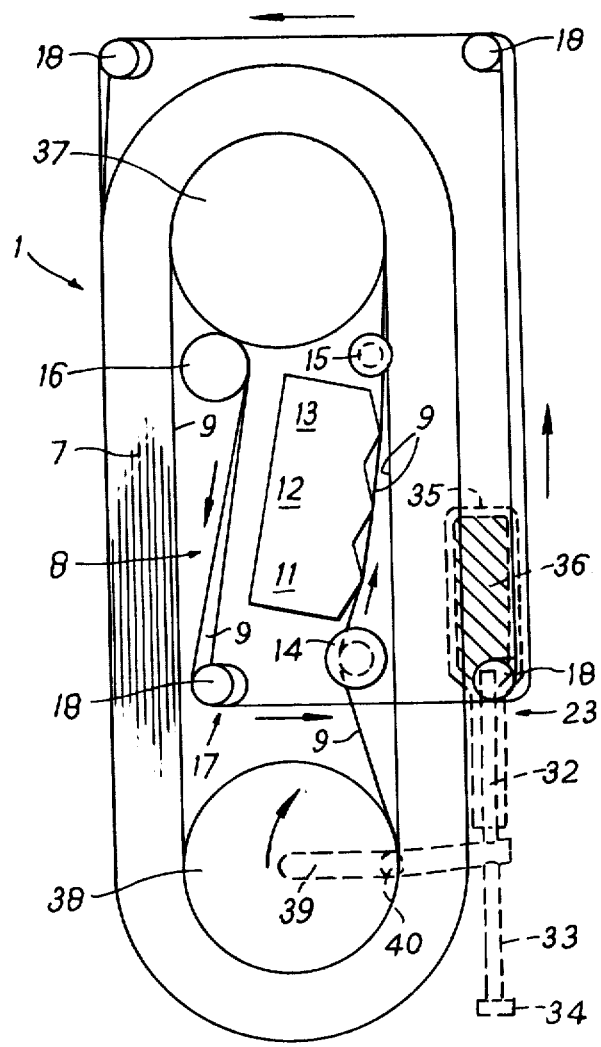

FIG. 3 shows an alternative embodiment to that of FIG. 1 in which only two rollers 37 and 38 are provided as the former means for the tape store 7, these rollers being of a larger diameter than the rollers 3, 4, 5 and 6 of FIG. 1 to make the elongated area 8 of sufficient size to accommodate the heads 11, 12 and 13, guide rollers 14, 15 and pinch roller 16 which co-operates with the roller 37 which is made the capstan in this embodiment. Four inclined rollers 18 are provided as before but the temperature-compensation device needs only act on one of the two rollers 37 and 38 and it is the latter which is movably mounted on one end of an arm 39 having a centre pivot 40 and having its other end urged into contact with the plunger 32 by the spring 33, this part of the device being similar to that of FIG. 1.

Figure 4:
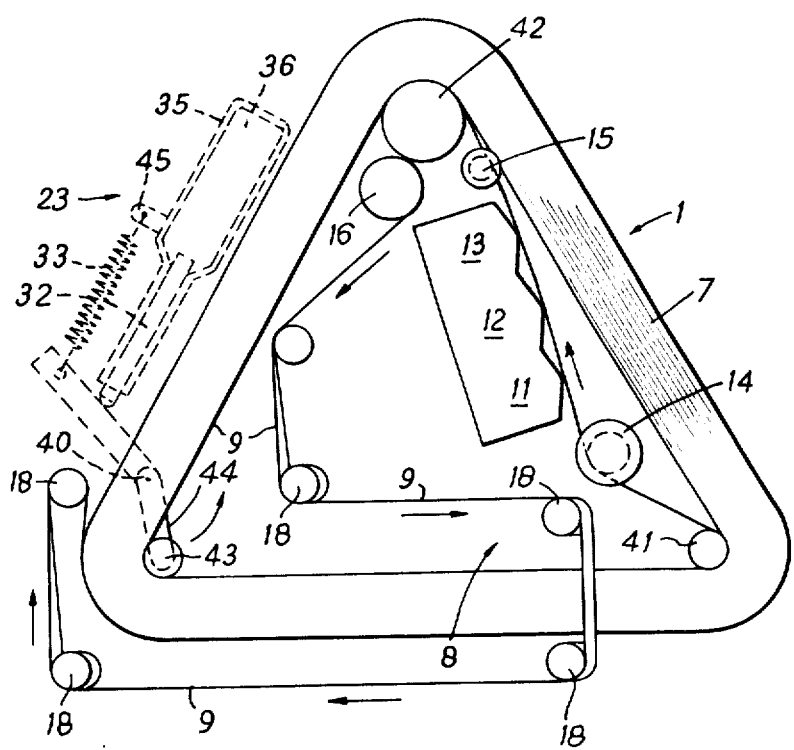

Former means comprising three rollers 41, 42 and 43 defining a triangular area 8 is shown in FIG. 4. In this embodiment, six inclined rollers 18 are employed although, as with FIG. 3, the temperature-compensation device 23 is associated with only one roller, namely roller 43 which is mounted on one end of a pivotally mounted crank arm 44. The plunger 32 and cylinder 35 are similar to those described above but the spring 33 acts between the arm 44 and a lug 45 provided on the cylinder. It will be noted that the diameter of the roller 42, which is made the capstan in this embodiment, is larger than that of the other two rollers 41 and 43 in order to give better tape drive.

FIG. 5 shows an embodiment having fifteen rollers 46 constituting the former means, a roller 50' being made the capstan and the two rollers 46" being movable and associated with respective temperature-compensation devices 23 generally similar to that of FIG. 4.

Figure 6:
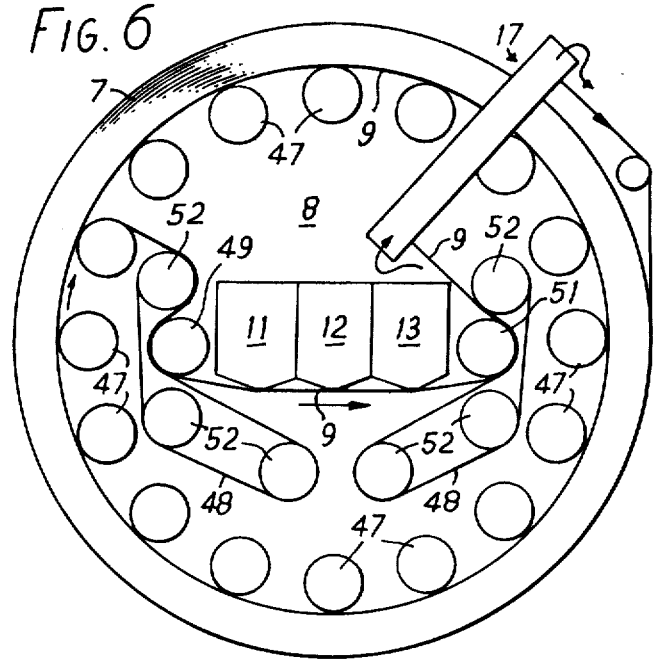
Figure 7:
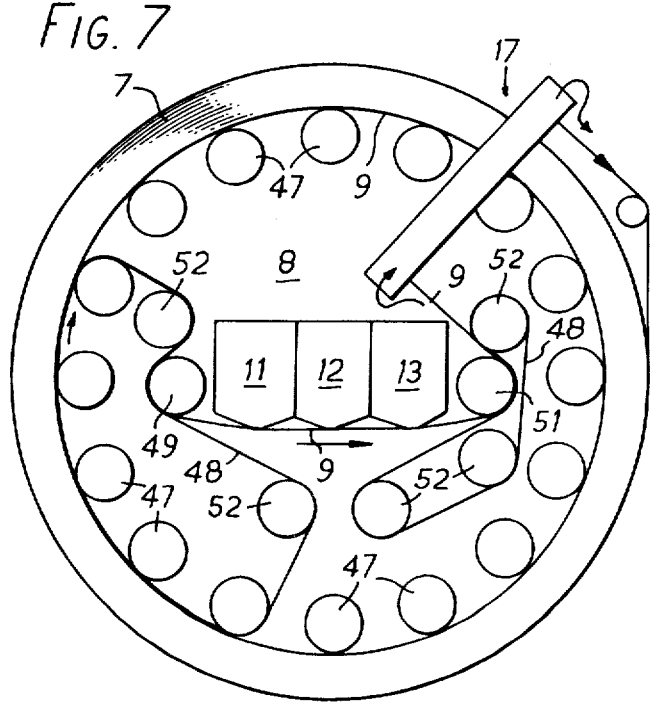

FIGS. 6 to 9 illustrate four further embodiments in which 16 rollers 47 are provided as the tape former means, the tape store 7 being shown as circular for convenience instead of polygonal. In these cases, the tape is driven by a capstan with one or two so-called co-belts which are driven in contact with a portion of the tape 9. In FIG. 6, two co-belts 48 of equal length are employed, the belts being driven by respective differential capstans 49 and 51, between the nips of which the tape 9 also passes, and also, each passing over three idler rollers 52. In FIG. 7, the right-hand co-belt 48 is similar to that of FIG. 6 but the left-hand belt passes over only two idler rollers 52 but also over five of the rollers 47, whereby the area of contact of the belt with the inner turn 9 of tape is much increased and the number of idler rollers reduced, providing a potentially more compact arrangement.

Figure 8:
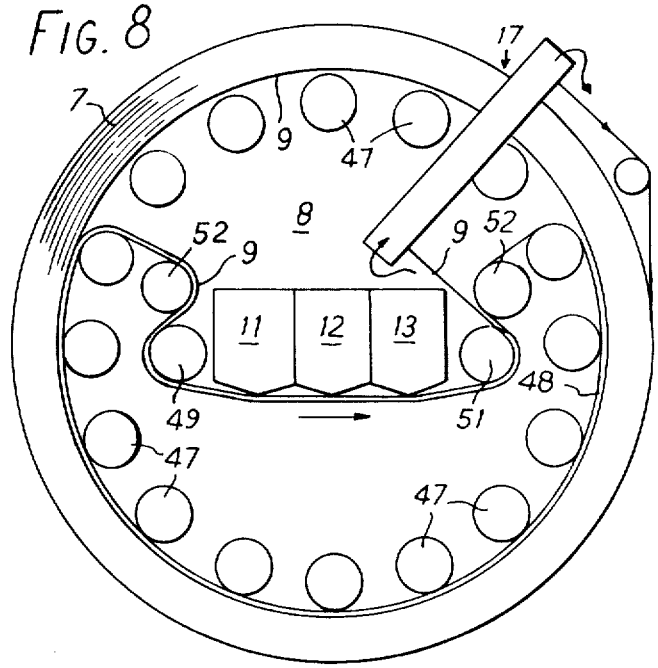
Figure 9:
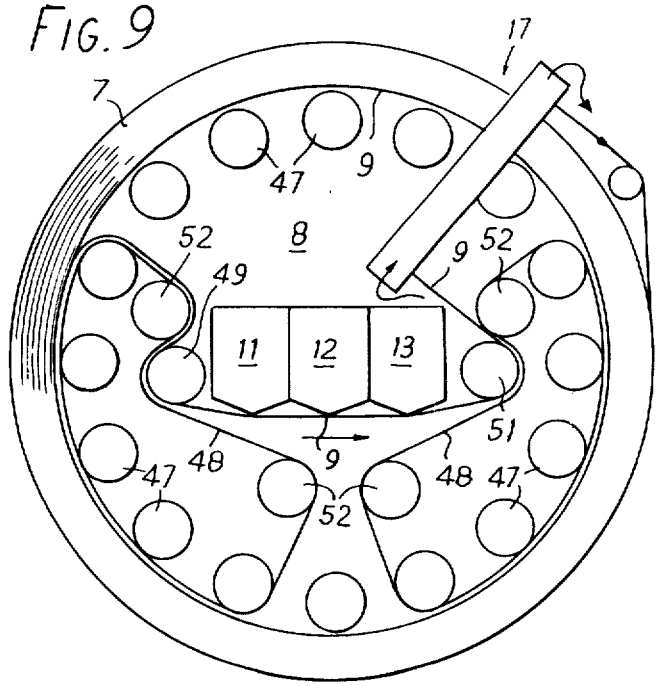

FIG. 8 shows the use of a single co-belt 48 which passes over two idler rollers 52 and eleven of the rollers 47, thus increasing the area of contact with the tape. FIG. 9 again shows the use of two equal co-belts 48 but they are larger than those of FIG. 6 and each passes over two idler rollers 52 and five of the rollers 47, whereby the area of contact with the tape 9 is almost as great as with the single belt of FIG. 8. This arrangement may not be suitable for some applications as the use of differential capstans, i.e., capstans driven at slightly different speeds, may produce tape looping in the area between the closely adjacent ends of the belts 48.

In all of the embodiments of FIGS. 6 to 9, the lift-over means 17 is indicated only diagrammatically and inclined rollers 18 such as employed in FIG. 1 may be used, or a rod-type arrangement such as shown in FIG. 10 may be used. As seen in FIG. 10, the rod-type arrangement comprises fixed vertical or inclined rods 53 and rotatable rods 54, the rods 53 and 54 being suitably oriented relative to each other to give the desired tape direction.

One or more temperature-compensation devices 23 may be employed with the embodiments of FIGS. 6 to 9.

Some advantages of recorders in accordance with the present invention have already been enumerated, namely the location of the lift-over means 17 downstream of the heads 11, 12 and 13, the minimizing of the area of precision engineering required, and the maximum use of space which results generally in a recorder being smaller than that of a comparable prior recorder. Additionally, the length of each turn of tape in the tape store 7 is greater than usual in order to provide a central area 8 of sufficient size to accommodate the heads 11, 12 and 13 etc., and this results in a reduced number of turns. The difference in tape tension across the tape store is a function of the number of turns in the store. Assuming constant tape velocity and interlayer friction, the fewer the number of turns, the lower the tension differential across the tape store which is desirable.

We claim:

1. A data recorder comprising a recording medium in the form of an endless loop of magnetic tape, and magnetic head means, the magnetic tape being wound around former means comprising a plurality of roller members to provide a tape store, the roller members and inner turn of tape in said loop defining within the center of the store an area in which the magnetic head means are mounted, at least one of said roller members being mounted near one end of a movable arm, means mounting said movable arm for pivotal movement in a plane parallel to the plane of the endless loop whereby pivotal motion of the movable arm adjusts the tension in said tape, temperature-sensitive expandable means to pivot said movable arm in accordance with temperature changes, said temperature sensitive means being providing pivotal movement of said movable arm to an extent which compensates for the change in loop length due to the same temperature change so as to maintain tape tension substantially constant.

2. A recorder according to claim 1, wherein two roller members are movably mounted on respective movable arms coupled together and a single temperature-sensitive means is used to effect the desired movement of both movable rotatable members.

3. A recorder according to claim 2, wherein the two movable arms are coupled together by two toothed sectors arranged in mesh and attached to respective arms.

4. A recorder according to claim 1, wherein the temperature-sensitive means comprises a cylinder and plunger with the cylinder containing a fluid which expands and contracts with temperature changes so as to move the plunger accordingly, said plunger being mechanically coupled to said movable arm.

5. A recorder according to claim 1, wherein two roller members are employed to provide a generally elongated area in which the magnetic head means are mounted.

6. A recorder according to claim 1, wherein three roller members are employed to provide a generally triangular area in which the magnetic head means are mounted.

7. A recorder according to claim 1, wherein four roller members are employed to provide a generally rectangular area in which the magnetic head means are mounted.

8. A recorder according to claim 1, wherein the number of roller members is such as to provide a generally circular area in which the magnetic head means are mounted.

9. A data recorder comprising a recording medium in the form of an endless loop of magnetic tape wound around a plurality of roller members to provide a tape store, means mounting at least one of the roller members being for movement so as to be positionable transversely in the plane of said loop, temperature-sensitive expandable means to adjust the position of said movable roller in response to changes in temperature, said temperature-sensitive means providing said positioning so that expansion and contraction of the tape due to temperature variations is accommodated so as to maintain tension in the tape substantially constant.

10. A recorder according to claim 9, wherein each movably mounted roller member is mounted on one end of a pivotable arm, the other end of which contacts said temperature-sensitive means so as to pivot the arm upon a change in temperature and thereby move the roller member in the required direction.

11. A recorder according to claim 10 wherein two roller members are movably mounted on respective pivotable arms coupled together and a single temperature-sensitive means is used to effect the movement of both movably mounted roller members.

12. A recorder according to claim 10, wherein the temperature-sensitive means device comprises a fixed cylinder and a movable plunger with the cylinder containing a fluid which expands and contracts with temperature changes so as to regulate the position of the plunger, said plunger being maintained in contact with a pivotable arm so as to adjust the position of the arm in accordance with temperature changes.

13. A recorder according to claim 11, wherein the two pivotable arms are coupled together by two toothed sectors arranged in mesh and attached to the respective arms.

* * * * *